United States Patent
Tuomikoski (10) Patent No.: US 8,182,700 B2
(45) Date of Patent: May 22, 2012

(54) METHOD AND EXHAUST ARRANGEMENT IN THE REMOVAL OF SURFACE SCUM

(75) Inventor: Pekka Tuomikoski, Rauma (FI)

(73) Assignee: Finnketju Invest Oy, Rauma (FI)

( * ) Notice: Subject to any disclaimer, the term of this patent is extended or adjusted under 35 U.S.C. 154(b) by 292 days.

(21) Appl. No.: 12/673,642

(22) PCT Filed: Jul. 15, 2008

(86) PCT No.: PCT/FI2008/050429
§ 371 (c)(1),
(2), (4) Date: Feb. 16, 2010

(87) PCT Pub. No.: WO2009/022051
PCT Pub. Date: Feb. 19, 2009

(65) Prior Publication Data
US 2011/0017680 A1  Jan. 27, 2011

(30) Foreign Application Priority Data

Aug. 13, 2007 (FI) ...................................... 20070605

(51) Int. Cl.
*B01D 21/24* (2006.01)
(52) U.S. Cl. ........ 210/776; 210/800; 210/523; 210/525; 210/540
(58) Field of Classification Search .................. 210/776, 210/800, 523, 525, 540, 541
See application file for complete search history.

(56) References Cited

U.S. PATENT DOCUMENTS 2,284,737 A  6/1942 Hirshstein
(Continued)

FOREIGN PATENT DOCUMENTS

JP  10277311  10/1998
(Continued)

OTHER PUBLICATIONS

PCT/ISA/210—International Search Report—Nov. 5, 2008.
(Continued)

*Primary Examiner* — Christopher Upton
(74) *Attorney, Agent, or Firm* — Venable LLP; Eric J. Franklin (57) ABSTRACT

A method and exhaust arrangement in the removal of surface scum. An exhaust arrangement is used existing in connection with a liquid basin. The exhaust arrangement includes a first surface chute arrangement for removal of surface scum utilizing an overflow arrangement, belonging to the first chute arrangement and being based on a continuous flow for overflowing the surface scum in at least two successive phases, from the fluid basin into a primary space in the fluid basin and from the primary space into a secondary space in the fluid basin, from where overflow is finally exhausted from the liquid basin utilizing an exhaust assembly for the surface scum. A second surface chute arrangement removes liquid processed in the liquid basin. Overflow of the surface scum in the primary space to the secondary space is controlled to minimize the amount of liquid drifting together therewith by adjusting a level of the liquid in the primary space utilizing a flow balancing assembly that connects the primary space and the second surface chute arrangement and/or by using an adjusting device existing in the wall defining the primary space and the secondary space. Passage of the surface scum in the primary space towards the secondary space is made more efficient by using a guiding arrangement for achieving a liquid flow in the primary space towards the secondary space to direct the surface scum.

6 Claims, 6 Drawing Sheets

U.S. PATENT DOCUMENTS

| | | | | | |
|---|---|---|---|---|---|
| 3,219,189 | A | * | 11/1965 | Moore | 210/540 |
| 5,089,118 | A | * | 2/1992 | Mahoney | 210/525 |
| 5,498,348 | A | * | 3/1996 | Plink et al. | 210/776 |
| 5,942,128 | A | * | 8/1999 | Fortier | 210/800 |
| 6,613,237 | B2 | * | 9/2003 | Pan et al. | 210/776 |
| 7,449,121 | B2 | * | 11/2008 | Toumikoski | 210/776 |

FOREIGN PATENT DOCUMENTS

| | | |
|---|---|---|
| WO | WO-9404464 A1 | 3/1994 |
| WO | WO-2006005788 A1 | 1/2006 |

OTHER PUBLICATIONS

PCT/ISA/237—Written Opinion of the International Searching Authority—Nov. 5, 2008.

* cited by examiner

METHOD AND EXHAUST ARRANGEMENT IN THE REMOVAL OF SURFACE SCUM

CROSS-REFERENCE TO RELATED APPLICATIONS

This application claims priority to Finnish patent application 20070605 filed 13 Aug. 2007 and is the national phase under 35 U.S.C. §371 of PCT/FI2008/050429 filed 15 Jul. 2008.

FIELD OF THE INVENTION

The invention relates to a method and an exhaust arrangement to be used in the removal of surface scum.

BACKGROUND OF THE INVENTION

A traditional solution in the purpose described above and particularly in square shaped basins is of the kind that a fluid processing apparatus, such as a clarification basin or like, comprises usually a special kind of a scraper bar arrangement, which has several scraper bars, existing one after the other in a longitudinal direction of a basin, and movement means for moving the same, such as two chains, being placed parallelly and being driven by means of a drive wheel and idle wheel assembly, in connection with which the scraper bars are fastened removably particularly in order to make easier the service and maintenance of the scraper bar arrangement. The type of scraper bar arrangements mentioned above are nowadays being used e.g. in connection with clarification basins in a way that the scraper bar/bars is/are transferred by chains, moving at opposite side or intermediate walls of the basin, alternatively on the surface and at the bottom of the basin, scraping sludge existing at the bottom to a sludge pocket while passing along the bottom, and, respectively guiding material existing on the surface to a collecting chute, which goes crosswise over the basin, while passing on the surface. There are also scraper bar arrangements, in which the bars are being moved e.g. by means of a carriage, moving above the basin, or e.g. by hydraulic arrangements. Also the shape of the basin may be in practice almost of whatever form. For example in circular basins a so called bridge scraper arrangement is a very usual solution for moving of surface scum.

In this connection, the surface scum is traditionally exhausted in a so to speak indirect manner, whereby the scrapers while passing on the surface, guide the material on the surface towards the collecting chute in a so called freedrifting manner. The collecting chutes, being used in this connection, are usually mechanically operated "suction chutes", which are being rotated from time to time around a longitudinal axis to a position, in which the surface scum is being "gulped" inside the same in order to lead it subsequently away from the liquid basin. On the other hand, in this connection a suction chute is used also, which has a moveable front wall, the operating principle of which is, however, in practice the same as described above.

A problem related to this kind of suction chutes is that they take along too much surface water, which can thus drift along with the surface scum furthermore to the exhaust channel of the surface scum. Also the bearing of such rotating suction structures to the walls of the basin is very difficult to carry out structurally, which is why among other things leakages are caused. In addition to the above, the suction chutes easily tend to get jammed among other things due to temperature differences. The type of mechanically operated chute arrangements described above require naturally also operating devices and automation in order to move the chutes, which is why this kind of implementations require a very dense service and maintenance in order to keep them operable. Furthermore, a problem in practice related to this kind of solutions is due to excessive surface scum getting collected on the surface of the liquid basin, together with which also other impurities may get collected. It is thus very usual that also organic processes may take place in the surface scum among other things in the form of algal growth.

For example in publication JP 102 773 11 there has been presented a solution applicable for the type of purpose described above, for being used for example in a so called clarification basin, which is based on an overflow of the surface scum taking place in successive phases. On the other hand a solution of a corresponding type in this respect may also be found from international publication WO 94/04464, which solution is meant for separating of oil or oil-containing substance from water by successive overflow discharges.

In this context also utilization of downwards sloping guiding surfaces has been suggested in the overflow discharge of the surface scum from one process space to another. In practice such a problem is involved with both of the above solutions that by principles represented therewith it is not possible to control the amount of water getting drifted along with the surface scum to be exhausted by simple and efficient enough arrangements.

Furthermore in international publication WO 2006/005788 there has been presented a method and arrangement for the removal of surface scum, which enable controlling of overflow from a primary space to a secondary space of surface scum particularly in order to minimize the liquid getting drifted therewith. This has been carried out by adjusting a surface level of the primary space by means of a flow balancing assembly connecting the primary space and the second surface chute arrangement and/or by using an adjusting device existing in the wall defining the primary space and the secondary space. The solution in question has been found very operative in practice, whereby, however, there has been found a further need for improvement in guiding of passage of the surface scum in the primary space towards the secondary space.

SUMMARY OF THE INVENTION

It is the aim of the method and the exhaust arrangement according to the present invention to achieve a decisive improvement in the problems described above and thus to raise essentially the level of prior art.

As the most important advantages of the method and exhaust arrangement according to the invention may be mentioned simplicity and efficiency of the structures enabled by the same as well as use of the same, thanks to which it is possible to improve significantly flowing of the surface scum in the removal of surface scum. The exhaust arrangement exploiting the method according to the invention prevents furthermore very efficiently drifting of surface scum along with the clarified liquid, such as water, to the exhaust piping. When applying the invention advantageously, it is possible to adjust speed and/or direction of the liquid flow that controls passage of the surface scum in the primary space suitably at any given time according to the amount and quality of the surface scum. Thanks to the more efficient flowing of the surface scum achieved by the invention, it is furthermore possible to construct the secondary space or in other words the so called suction chute shorter than in present solutions, whereby the efficiency of the surface scum removal still continues to be the same without an increase of the clarified liquid, such as escort water in the surface scum to be exhausted. Along with an increase of escort water in the primary space, however, the amount of water drifting along with the surface scum to the secondary space not getting increased, a very good movement (flow) on the surface of the liquid basin is achieved, whereby surface scum gets drifted from a very wide area. Thus separate scraper arrangements are not necessarily at all needed for moving of the surface scum. It is also possible that the present overflow chutes can be replaced by the principle according to the invention.

Thanks to the method and exhaust arrangement according to the invention in addition to savings in investment costs, it is furthermore possible to minimize significantly installation, maintenance and service measures involved with traditional solutions by virtue of the exhaust arrangement's self-operated and optimal functioning so that excessive surface scum may not get collected in the liquid basin. On the other hand thanks to the operating principle based on a continuous flow, the surface scum also keeps continuously moving, which is why it is neither able to solidify nor to have e.g. algal growth therein. A practical advantage of the invention has also been found to be that a "leakage arrangement" according to the invention prevents efficiently mixing of surface scum with the overflow discharge.

BRIEF DESCRIPTION OF THE DRAWINGS

In the following description the invention is being depicted in detail with reference to the appended drawings, whereby
in FIGS. 1a-1c
are shown some advantageous alternative or mutually combinable exhaust arrangements according to the method of the invention as side views (FIGS. 1a and 1c) and as a cross sectional view (FIG. 1b),
in FIGS. 2a and 2b
is shown an advantageous operating principle of the method and the exhaust arrangement according to the invention, and
in FIG. 3
is shown a series of pictures of an advantageous structure for adjusting the direction and quantity of liquid flow in connection with the embodiment according to FIGS. 2a and 2b.

DETAILED DESCRIPTION OF EMBODIMENTS OF THE INVENTION

The invention relates first of all to a method in the removal of surface scum, whereby an exhaust arrangement 2 is being used existing in connection with a liquid basin N, such as a settling tank or like. The exhaust arrangement comprises a first surface chute arrangement 2a for removal of surface scum by means of an overflow arrangement 2a1, belonging to the same and being based on a continuous flow, by means of which the surface scum is being overflown in at least two successive phases, in the first place from the fluid basin N into a primary space I in the fluid basin and on the other hand furthermore therefrom into a secondary space II in the fluid basin, from where it is being finally exhausted from the liquid basin by means of an exhaust assembly P for the surface scum, such as by one or more exhaust pipes, channels or like. The exhaust arrangement comprises furthermore a second surface chute arrangement 2c for removal of liquid, being processed in the liquid basin, such as clarified water. Overflow of the surface scum in the primary space I to the secondary space II is being controlled particularly in order to minimize the amount of liquid drifting together therewith by adjusting a level h1 of the liquid in the primary space I by means of a flow balancing assembly 2a2, connecting the primary space I and the second surface chute arrangement 2c, and/or by using an adjusting device LL existing in the wall defining the primary space I and the secondary space II. Passage of the surface scum in the primary space I towards the secondary space II is being made more efficient by using a guiding arrangement X by means of which a liquid flow W taking place in the primary space I towards the secondary space II is achieved to direct the surface scum.

Figure 1A:
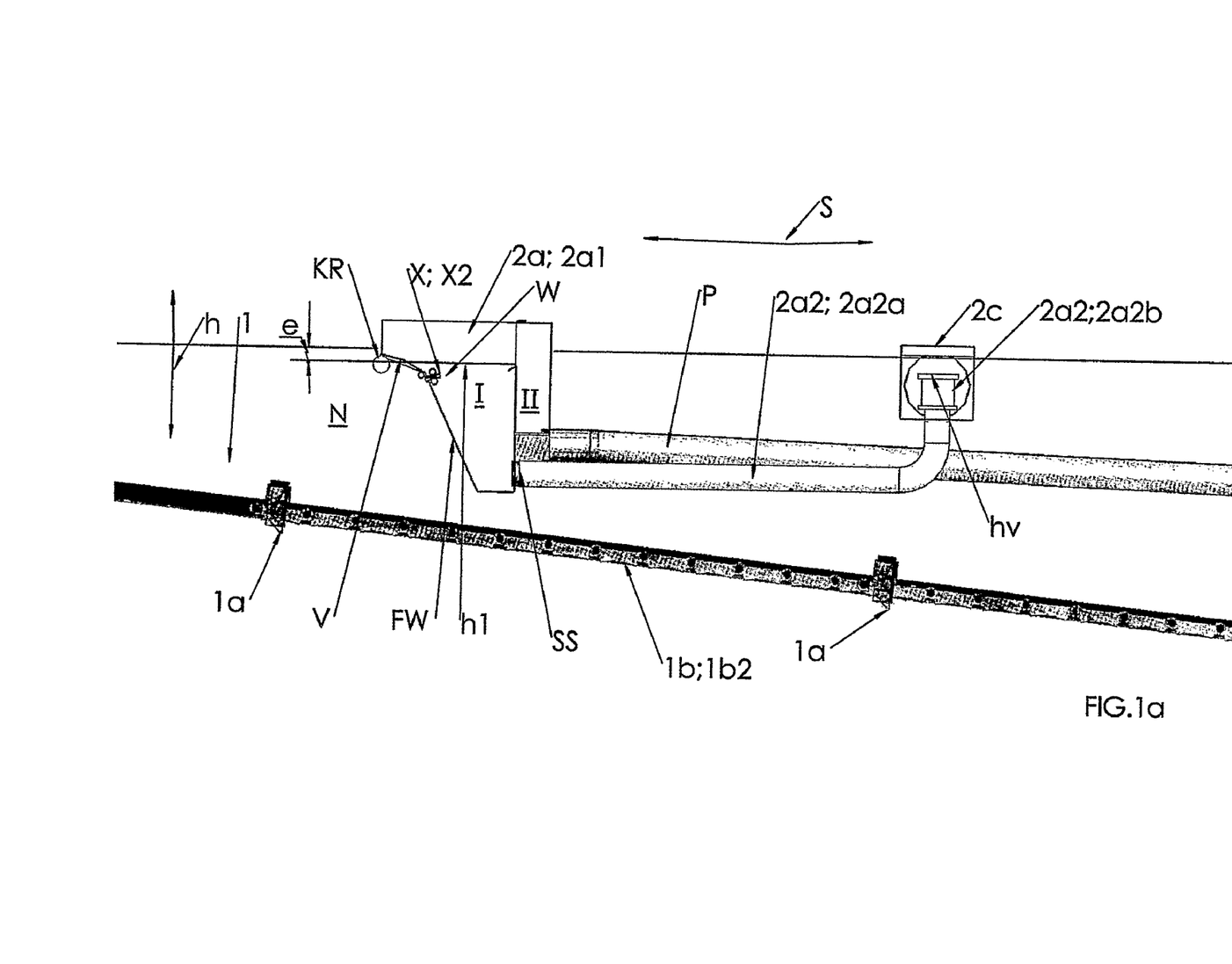

Especially an embodiment applying the method, being shown as an exemplary side view in FIG. 1a, comprises furthermore a scraper bar arrangement 1 that moves in the liquid basin, such as a settling tank or like, and that is meant for scraping of material existing in the liquid basin to the first surface chute arrangement 2a, existing essentially in a crosswise direction with respect to the longitudinal direction s of the liquid basin and the width of which for example corresponds to the width of the fluid basin. As an advantageous embodiment, the scraper bar arrangement 1 consists of one or more scraper bars 1a, existing one after the other in the longitudinal direction s and being adapted moveable by means of drive elements 1b, such as one or more transmission chains 1b2 or the like, being driven through the intermediary of a drive wheel and idle wheel arrangement 1b1 or in a like fashion, in connection with which the scraper bar 1a is fastened. The surface scum is being exhausted in the embodiment shown in FIG. 1 by means of the overflow arrangement 2a1 in a way, that the scum on the surface of the liquid basin is being overflown from the liquid basin N in a first phase by means of a downwardly sloping guide surface V to a primary space I, from which the surface scum is being overflown subsequently in a following phase to a primary space II, from which it is being exhausted finally from the liquid basin N by means of an exhaust assembly P for the surface scum, such as by one or more exhaust pipes, channels or like. The meaning of the downwardly sloping guide surface is to keep the flow of the surface scum along the guide surface as laminar as possible, so that it would remain on the surface in the primary space I.

Figure 1B:
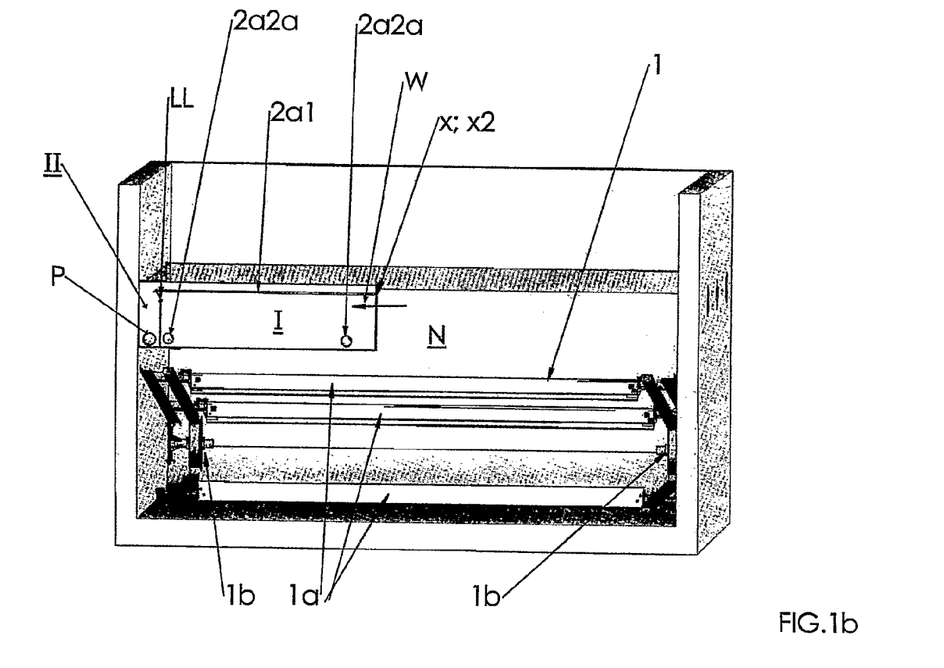
Figure 1C:
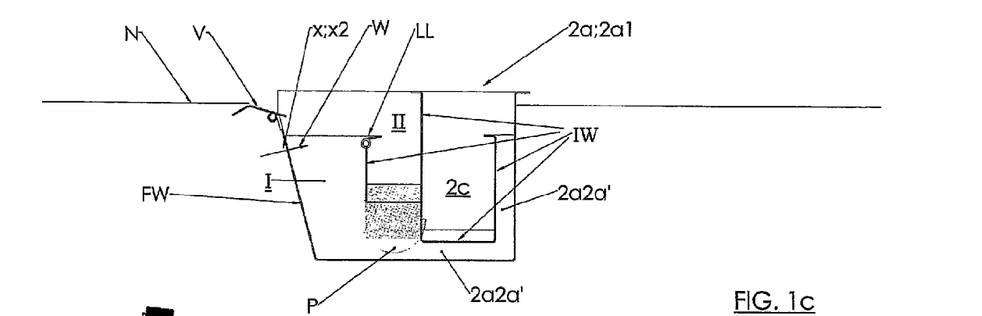
Figure 2A:
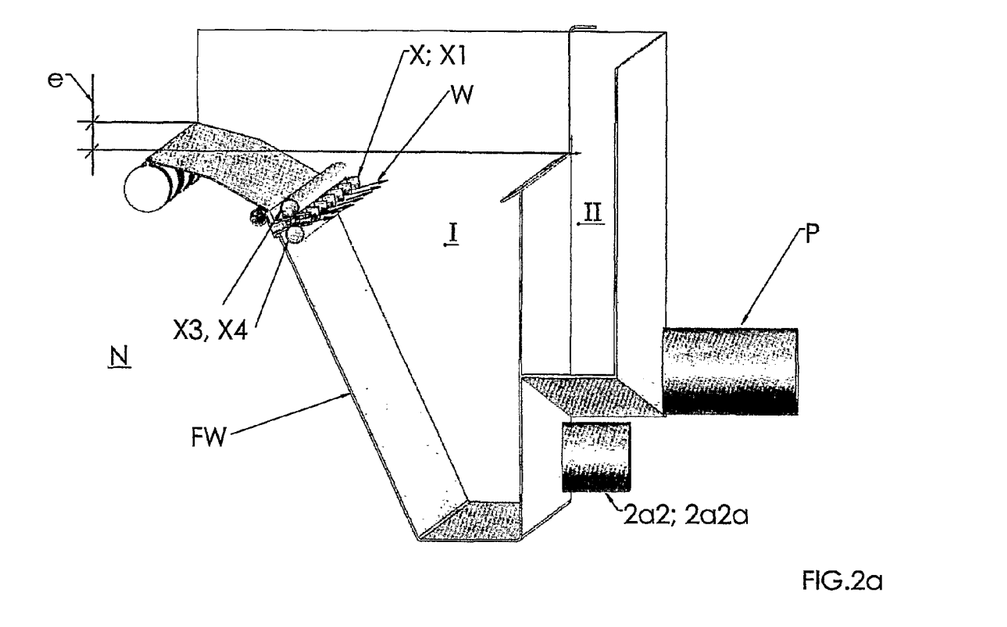
Figure 2B:
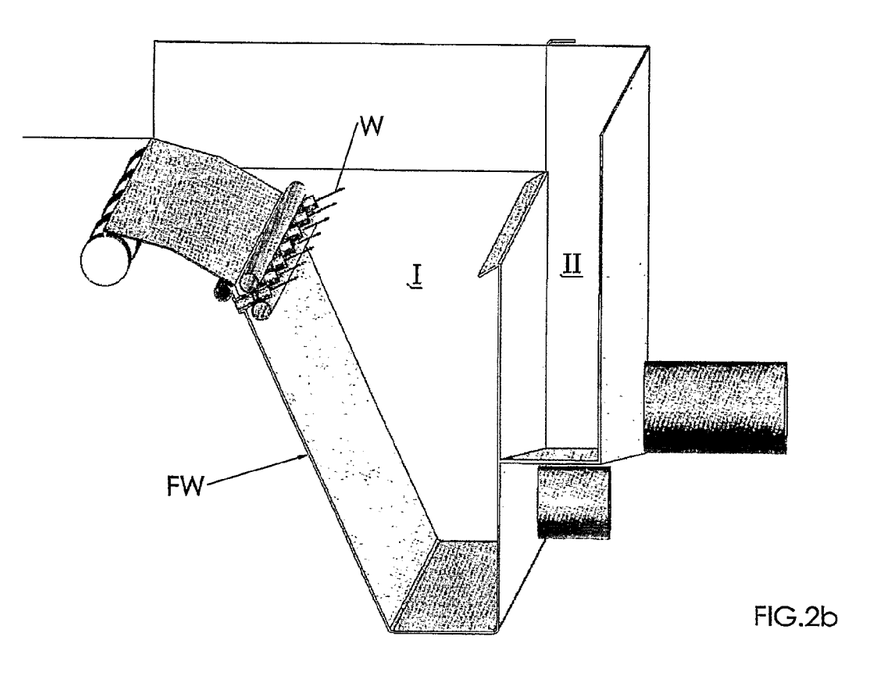

Furthermore as an advantageous embodiment with reference to the embodiment shown as an exemplary cross sectional view in FIG. 1b, the secondary space II is placed in a crosswise direction side by side with the primary space I. Furthermore in the advantageous embodiment shown particularly in FIG. 1c as an exemplary side view, the primary space I, the secondary space II, the flow balancing assembly 2a2 and at least a part of the second surface chute arrangement 2c, all belonging to its overflow arrangement 2a1, are arranged as an essentially integral entirety, whereby the primary space I, the secondary space II, said part of the second surface chute arrangement 2c and a flow channel 2a2a', belonging to the flow balancing assembly, all being placed one after the other in the longitudinal direction and separated from the liquid space N of the liquid basin from the frontal side by a wall FW, are limited from each other by mutual walls IW.

As an advantageous embodiment of the method according to the invention, the liquid flow W is carried out in a self-powered manner by exploiting a difference e in surface levels of the liquid basin N and the primary space I, which is achieved as a further advantageous embodiment by a hole X2, nozzle assembly X1 and/or a like, existing in a wall FW defining the liquid basin N and the primary space I, the liquid spaces thereof being thus connected by said assembly.

Figure 3:
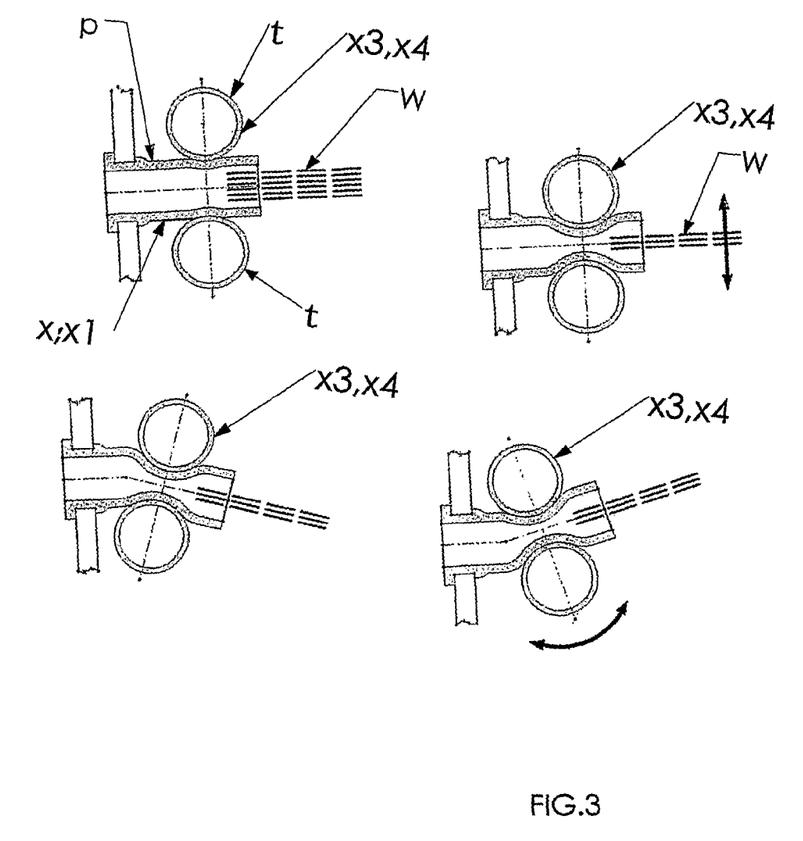

Furthermore as an advantageous embodiment of the method particularly with reference to the exemplary series of pictures in FIG. 3, a volume and/or direction of the liquid flow W is being adjusted by changing the flow-through cross section and/or direction of the hole X2, nozzle assembly X1 and/or the like belonging to the guiding arrangement X by means of control means X3, X4.

The invention relates on the other hand also to an exhaust arrangement operating according to the method described above, which comprises a guiding arrangement X for making more efficient passage of the surface scum in the primary space I towards the secondary space II, which guiding arrangement achieves a liquid flow W in the primary space I towards the secondary space II in order to direct the surface scum.

As an advantageous embodiment of the exhaust arrangement according to the invention particularly with reference to FIGS. 1a-1c and 2a, 2b, the liquid flow W is achieved by a self-powered guiding arrangement X, which exploits a difference e in surface levels in the liquid basin N and the primary space I, and which comprises as a further advantageous embodiment a hole X2, nozzle assembly X1 and/or a like existing in the wall FW defining the liquid basin N and the primary space I, the liquid spaces thereof being thus connected by said assembly.

Furthermore as an advantageous embodiment of the exhaust arrangement particularly with reference to the series of pictures shown in FIG. 3, the guiding arrangement X comprises first control means X3 for adjusting of a volume of the liquid flow W taking place in the primary space I by changing a flow-through cross section of the hole X2, nozzle assembly X1 and/or the like, and furthermore as an advantageous embodiment also second control means X4 for adjusting of direction of the liquid flow W taking place in the primary space I by changing the direction of the hole X2, nozzle assembly X1 and/or the like. As shown in FIG. 3, the nozzle assembly X1, being placed at an adequate depth below the liquid surface of the primary space I, is formed of nozzles, being placed successively in the crosswise direction and which are carried out in the embodiment shown in the series of pictures in question by flexible and elastic pipes p, being fastened to the wall FW tightly by a so called collar joint. The cross section of the pipes and bending thereof is made possible by control rods t being placed at opposite sides thereof.

In this context it is essential that the nozzle or hole assemblies X1, X2 are placed at an adequate depth below the surface of the primary space, so that the flow taking place therethrough does not cause excessive turbulence for the surface scum on the surface. Naturally in this context it is possible e.g. on the principle shown in FIGS. 1a-1c to use also holes X2 in the front wall FW or that exist in a separate perforation plate, being fastened thereto e.g. by a bellows joint in order to enable twisting thereof, whereby flow-through taking place therethrough can be controlled e.g. by a uniform throttle plate, which restricts simultaneously the cross section of each hole.

As shown in the appended drawings, the hole X2, nozzle assembly X1 and/or the like belonging to the guiding arrangement X is arranged naturally most preferably on the wall of the primary space I, being opposite to the intermediate overflow wall that separates the primary space I and the secondary space II.

It is clear that the invention is not limited to the embodiments presented or described above, but it can be modified within the basic idea of the invention in very many ways depending on the needs at any given time. Thus, the invention also relates at its widest to basins, which do not necessarily have any kind of a scraper bar arrangement and/or, in which the surface scum is being transferred by whatever kind of system toward the suction chute. There exists naturally a large amount of different kinds of scraper bar structures, in addition to which it is possible to use in connection with the same e.g. filling materials, e.g. based on polyurethane or like etc. Furthermore for the part of the overflow arrangement, it is possible to carry out the downwardly sloping guide surface by straight surfaces, getting deeper periodically, or e.g. by a continuously arched surface, which may be either convex or concave. In connection with the counterpart surface it is furthermore possible to use certain kinds of flow guidance arrangements, such as e.g. a perforated or grooved guide plate, by means of which the surface scum is being directed tangentially onto the surface of the primary space.

In an embodiment according to the invention it is furthermore possible to exploit filters SS, as shown e.g. in FIG. 1a, also in other flow pipes or channels. Furthermore it is also possible to exploit both in square shaped and circular basins embodiments, in which the primary space and the secondary space are one after the other in the flow direction, but the widths of which do not correspond to the total width of the basin, as is the case particularly in the embodiment shown in FIG. 1b. This is thanks to good flowing of the surface scum that is made possible by the solution according to the invention. A liquid basin can have, when necessary, two or more exhaust arrangement entireties like this or like the ones shown e.g. in FIG. 1c for example depending on the size of the liquid basin. Furthermore it is possible to carryout the secondary space so that it descends towards the exhaust assembly for the surface scum. The method according to the invention can be exploited also e.g. in use of an exhaust arrangement, being equipped with floating structures, being thus able to get freely positioned in the vertical direction according to the surface of the liquid basin.

The invention claimed is:

1. A method in the removal of surface scum, the method comprising:
using an exhaust arrangement connected to a liquid basin, the exhaust arrangement comprising a first surface chute arrangement for removal of surface scum utilizing an overflow arrangement, belonging to the first chute arrangement and being based on a continuous flow, wherein the surface scum is overflown in at least two successive phases, from the fluid basin into a primary space in the fluid basin and from the primary space into a secondary space in the fluid basin, from where the surface scum is finally exhausted from the liquid basin utilizing an exhaust assembly for the surface scum, and a second surface chute arrangement for removal of liquid, being processed in the liquid basin, and whereby overflow of the surface scum in the primary space to the secondary space is controlled to minimize an amount of liquid drifting together therewith by adjusting a level of the liquid in the primary space utilizing a flow balancing assembly, connecting the primary space and the second surface chute arrangement, and/or by using an adjusting device existing in the wall defining the primary space and the secondary space, wherein passage of the surface scum in the primary space towards the secondary space is made more efficient utilizing a liquid flow in the primary space towards the secondary space by using a self-powered guiding arrangement that exploits a difference in surface levels of the liquid basin and the primary space, wherein the liquid flow is achieved by a hole and/or a nozzle assembly existing in a wall defining the liquid basin and the primary space, the liquid spaces thereof being thus connected by said assembly.

2. The method according to claim 1, wherein a volume and/or direction of the liquid flow is adjusted by changing a flow-through cross section and/or direction of the hole and/or nozzle assembly belonging to the guiding arrangement utilizing a control.

3. An exhaust arrangement for the removal of surface scum from a liquid basin, the exhaust arrangement comprising:
- a first surface chute arrangement for removal of surface scum, the first surface chute comprising an overflow arrangement based on a continuous flow by letting the surface scum overflow in at least two successive phases, from the fluid basin into a primary space in the fluid basin and from the primary space into a secondary space in the fluid basin, in order to exhaust the surface scum finally from the liquid basin utilizing an exhaust assembly for the surface scum,
- a second surface chute arrangement for removal of liquid, being processed in the liquid basin,
- a flow balancing assembly connecting the primary space and the second surface chute arrangement, and/or an adjusting device existing in the wall defining the primary space and the secondary space for making possible controlling of overflow of the surface scum from the primary space to the secondary space in order to minimize the amount of liquid drifting together therewith by adjusting a level of the liquid in the primary space, and
- a self-powered guiding arrangement that exploits a difference in surface levels of the liquid basin and the primary space in order to make passage of the surface scum in the primary space towards the secondary space more efficient utilizing a liquid flow in the primary space towards the secondary space, which guiding arrangement comprises a hole and/or a nozzle assembly existing in a wall defining the liquid basin and the primary space, the liquid spaces thereof being thus connected by said assembly.

4. An exhaust arrangement according to claim 3, wherein the guiding arrangement comprises a first control for adjusting of a volume of the liquid flow taking place in the primary space by changing a flow-through cross section of the hole and/or nozzle assembly.

5. An exhaust arrangement according to claim 4, wherein the guiding arrangement comprises a second control for adjusting of direction of the liquid flow taking place in the primary space by changing the direction of the hole and/or nozzle assembly.

6. An exhaust arrangement according to claim 3, wherein the hole and/or nozzle assembly belonging to the guiding arrangement is arranged on the wall of the primary space, being opposite to the intermediate overflow wall that separates the primary space and the secondary space.

* * * * *